United States Patent Office 3,449,909
Patented June 17, 1969

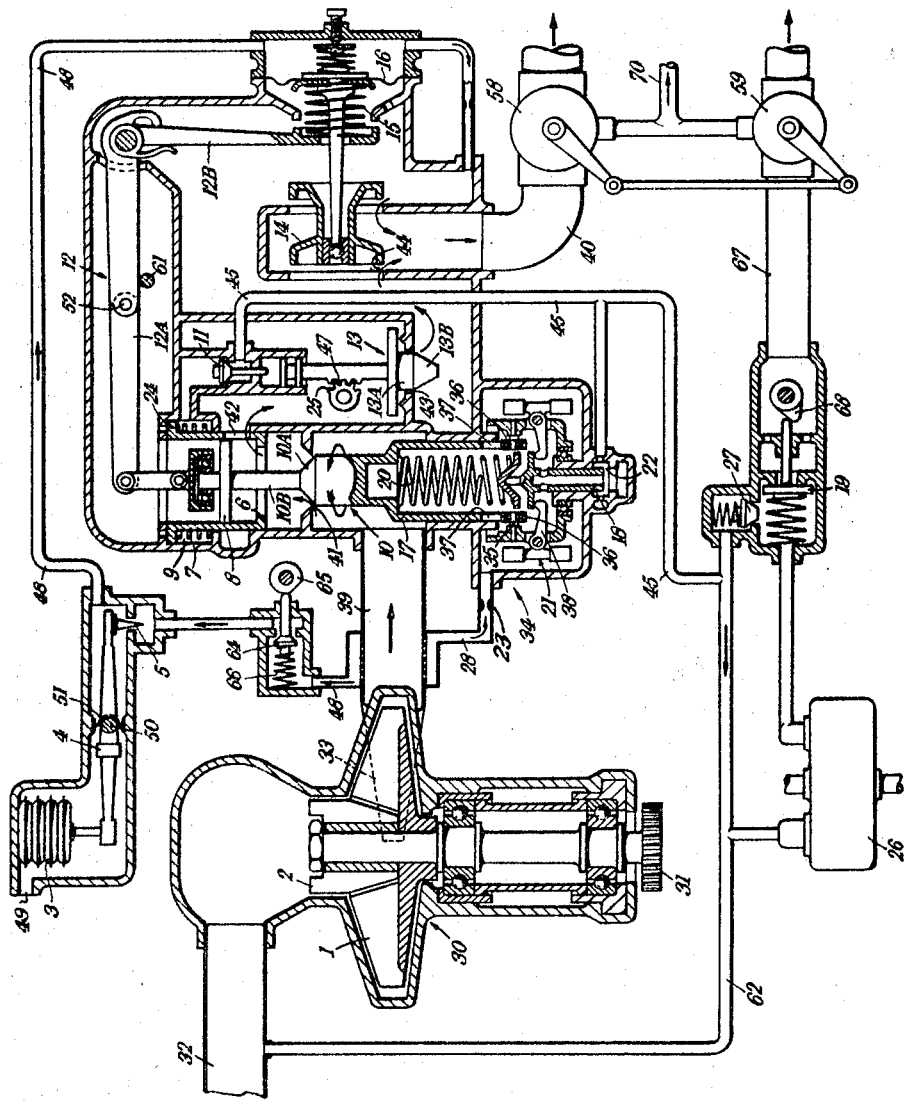

3,449,909
FUEL SUPPLY SYSTEMS FOR AIRCRAFT JET ENGINES
David Marshall and Arthur Leslie Lloyd, Wolverhampton, England, assignors to H. M. Hobson Limited, London, England, a company of Great Britain
Filed Mar. 21, 1967, Ser. No. 624,924
Int. Cl. F02c 3/24, 7/22, 9/08
U.S. Cl. 60—39.28       16 Claims

ABSTRACT OF THE DISCLOSURE

A fuel supply system for an aircraft jet engine, in which a pump supplies fuel to the main burner of the engine through a number of orifices in series, in which each orifice is variable independently of the others to provide a different mode of control of the engine and in which the pressure drop across the metering orifices is varied as a function of engine speed.

---

This invention provides a fuel supply system for an aircraft jet engine having a main burner, comprising a pump arranged to supply fuel to the main burner through a number of metering orifices in series, each orifice being variable independently of the others by an individual control mechanism to provide a different mode of control of the engine, and a device for varying the pressure drop across the metering orifices as a function of engine speed.

In a preferred form of fuel supply system according to the invention, the centrifugal pump delivers fuel through a number of valves in series. These collectively control the fuel flow to the engine by varying the restrictions they present to the flow. There are three modes of control: acceleration control, maximum speed control, and throttle control, each being effected by a valve controlling the area of one of the metering orifices. A fourth restriction is controlled by a servovalve which determines the pressure drop across the three metering orifices. The system is such that in general only one of the three metering orifices is varying, i.e., only one mode of control is operational, at one time, the effective areas of the other two metering orifices remaining constant. The fuel flow is therefore completely determined by the operational metering orifice and the pressure drop, which is controlled by the servovalve.

At rotational speeds of the engine below a given changeover speed, e.g., ground idling speed, the acceleration control unit (A.C.U.) is in complete control. This schedules the fuel flow as a function of engine speed and altitude, providing a margin of fuel flow in excess of what is required for steady running at each speed. The amount of this excess is that which is needed to produce the required acceleration for starting. This control is effected by scheduling both the flow area of the metering orifice controlled by the A.C.U. valve and the setting of a pressure regulating valve as a function of engine speed. The setting of the pressure regulating valve is also a function of altitude.

At the higher speeds, the throttle is in complete control. The pressure regulating valve then controls the pressure drop to a value which is a function of altitude. The engine thrust is then substantially proportional to the position of the pilot's throttle lever.

The speed of the engine has to be limited to a fixed maximum value and this is done by means of a valve controlled by a governor which overrides the other controls when the maximum speed is reached. In this condition the engine comes under closed loop speed control.

One form of fuel supply system according to the invention is illustrated by way of example, with reference to the accompanying drawings which show the system in diagrammatic form.

A centrifugal pump 30 is driven by a spur gear 31 from the shaft (not shown) of the high speed compressor of the engine. To reduce the possibility of cavitation, the fuel, which is fed through an inlet 32 to the centrifugal pump from booster pumps (not shown), is passed through a screw type inducer 2 before it enters the main impeller 1 of the pump. Pressure recovery is effected through a tangential diffuser 33.

The fuel from the pump 30 passes, through a pipe 39 to a pipe 40 leading to the main burner (not shown) through three metering orifices in series 41, 42, 43, and another orifice 44 controlled by a pressure regulating valve.

The acceleration control unit 34 serves to prevent compressor surge and facilitates automatic starting. It also serves to limit the engine to a maximum rotational speed. As both these controls work off a governor, they are integrated into one subassembly. The governor 21 is driven from the shaft of the high speed compressor through reduction spur gears (not shown). To ensure minimum inaccuracies arising from friction and also the risk of failure due to sticking, a servopiston 17 is rotated in unison with the governor through pegs 35. The pegs support ball races 36 which engage in slots 37 in the servopiston 17 to permit axial movement of the servopiston.

As the governor rotates, its flyweights 38 apply a force to the servopiston 17 through a spring 20 and also control the axial position of a servovalve 18, which is also spun with the governor. Fuel at the delivery pressure of the pump in the pipe 39, which pressure is applied to the top side of the servopiston 17, flows through a line 28, and a fuel potentiometer constituted by a servoorifice 22 controlled by the valve 18 and a restrictor 23, to a line 62 leading to the suction side of the pump 30 so that the pressure drop across the piston 17 is controlled by the valve 18. The servopiston 17 and an A.C.U. metering valve 10, attached to it and controlling the effective area of the orifice 41, are thus positioned as a function of engine speed. The valve 10 has a coned portion 10A which controls the area of the orifice 41 at low speeds at which the engine is under control of the A.C.U. 34 and a parallel portion 10B which is in register with the orifice 41 at higher engine speeds when the engine is under control of a throttle valve 13 as later explained. Consequently in the range of speeds at which the engine is under throttle control the governor 21 is ineffective to change the flow of fuel through the orifice 41.

The orifice 43 is controlled by the throttle valve 13, which is operated from the pilot's lever (not shown) through the agency of a rack 47 and a pinion 25. The valve 13 has a cylindrical portion 13A which is in register with the orifice 43 while the A.C.U. 34 is controlling the flow of fuel through the agency of the valve 10 and a coned portion 13B which becomes effective to control the orifice 43 at higher speeds when the engine is under throttle control. The profile of the coned portion 13B of the valve is such as to give a linear increase in thrust between 60% and 100% full thrust. The throttle valve 13 cuts off fuel flow completely when the throttle lever is moved to the shut-off position.

When the engine speed rises to its maximum specified value, a cut-off valve 8, attached to the valve 10, which normally has no significant effect on the fuel flow, comes into operation by approaching its seat 6 and reducing the flow through the orifice 42. This overrides the throttle valve 13, allowing the governor 21 to bring the engine under closed loop control to prevent further increase in speed.

The valve 8 only affects the fuel flow when it is close to the seat 6 and this does not occur until the engine speed approaches its maximum value. If the engine speed deviates from the specified maximum value for which the governor 21 is set while the engine is under closed loop control, the governor 21 will move the valve 8 to change the fuel flow to the engine to restore the engine speed to the chosen value.

The servovalve 18 bleeds fuel from the upstream side of the valve 10 at a rate dependent on engine speed and thus varies the pressure drop across the metering orifices 41, 42 and 43 as a function of engine speed. As engine speed increases, the servo valve 18 moves down to reduce the bleed and so increase the pressure drop.

Provision is also made for an emergency overspeed condition. When the pilot's lever is moved through the throttle guard to an "emergency override" position, this not only further opens the throttle valve 13 but, in so doing, also causes the throttle valve 13 to open an overspeed valve 11 disposed in alignment with it. Fuel in the annulus 9 is then bled through a line 45 and a line 62 to the pump inlet through the over-speed valve 11. This reduces the fuel pressure acting on the underside of a piston 24 carrying the valve seat 6, so causing the fuel pressure acting on the top of the piston 24 to move it down against the action of a spring 7, and shift the valve seat 6 away from the cut-off valve 8, so increasing the flow of fuel to the engine and giving a higher governed speed.

The pressure regulating valve controlling the orifice 44 comprises a balanced valve assembly 14 operated by a diaphragm 16. The diaphragm 16 is subject at its left hand side to the pressure of a spring 15 and at its right hand side to the pressure of fuel in a line 48 by-passing the valve 10 and the throttle valve 13, and communicating with the line 40 at the upstream side of the valve 14. A valve 64 in the line 48 is held open by a cam 65 when the throttle valve 13 is in the open position but is closed by a spring 66 when the throttle valve 13 is shut. The fuel pressure acting on the right hand side of the diaphragm 16 and determining the position of the valve 14, is a fraction of the pressure drop across the metering orifices 41, 42 and 43. This fraction is determined by the opening of a needle valve 5 which controls the flow of fuel through the line 48. The position of the needle valve 5 is determined by the expansion of an evacuated capsule 3 subject to ambient pressure through an inlet 49. A beam balance 4, pivoted at 50, is used to transmit the movement from the capsule 3 to the valve 5 through a seal 51 separating air from fuel. As altitude increases, the capsule 3 expands, so opening the needle valve 5 so that, for a given pressure drop across the three metering orifices 41, 42, 43, the fuel pressure applied to the right hand side of the diaphragm 16 is increased so causing the pressure regulating valve 14 to close, and the pressure drop across the three orifices to be reduced. It follows that, for any given demand from the valve 10 or the throttle valve 13, the fuel flow will reduce with increase in altitude.

It will accordingly be appreciated that, at speeds up to ground idling speed, the A.C.U. is in complete control controlling the fuel flow through the agency of the valve 10. When the A.C.U. 34 is in control, the pressure drop is also regulated according to engine speed. This is achieved by means of a bell crank 12, one arm 12A of which is connected to the valve 10 and the other arm 12B of which constitutes an abutment for the spring 15, which increases the load of the spring 15 as speed increases due to downward movement of the valve 10, thereby reducing the pressure drop through the pressure regulating valve 14 and increasing the pressure drop across the valves 10 and 13. At ground idling speed, the link 12 encounters a stop 61, so preventing further compression of the spring 15. A yieldable joint 52 in the arm 12A of the bell crank 12 permits the valve 10 to continue to move after the stop 61 has been encountered.

At speeds above ground idling the throttle valve 13 is in control of the fuel flow, until such time as the cut-off valve 8 is brought into operation.

The primary burners (not shown) are supplied with fuel through a line 67 from a gear pump 26 which is driven through gears (not shown) from the engine. The fuel from the pump 26 passes through a valve 19 operated from the pilot's lever by means of a cam 68 so that the line 67 is closed at shut-down and above ground idling. When the line 67 is closed, a relief valve 27 passes fuel from the gear pump 26 to the inlet of the centrifugal pump 30.

Shut-off cocks 58, 59 are provided in the burner lines 40 and 67. These shut-off cocks are mechanically linked together and to a lever (not shown) in the cockpit which can be used in emergency for shutting down an individual engine. When shut, they also open the burner lines 40 and 67 to a dump line 70 so that the residual fuel is removed to prevent burning.

The thrust of the engine is thus selectable by a single lever and the main burner is automatically kept within its safe operating limits at all times.

We claim:

1. A fuel supply system, for an aircraft jet engine having a main burner, comprising a pump arranged to supply fuel to the main burner through three independently controlled metering orifices in series, one of the orifices being controlled below a predetermined changeover speed by an acceleration control valve subject to the action of an acceleration control unit, another of the orifices being controlled by an override valve actuated by a governor to prevent the engine speed exceeding a predetermined maximum, and the third orifice being controlled by a throttle valve during the range of speeds between the change-over speed and the maximum speed, and mechanism for varying the pressure drop across the orifices as a function of engine speed, said override valve having a movable seat and said system including means operable, upon movement of the throttle valve to an emergency position, to move the seat away from the override valve to increase the flow of fuel to the engine.

2. A fuel supply system, for an aircraft jet engine having a main burner, comprising a pump arranged to supply fuel to the main burner through three independently controlled metering orifices in series, one of the orifices being controlled below a predetermined changeover speed by an acceleration control valve subject to the action of an acceleration control unit, another of the orifices being controlled by an override valve actuated by a governor to prevent the engine speed exceeding a predetermined maximum, said governor being operative to position both said acceleration control unit and said override valve, and the third orifice being controlled by a throttle valve during the range between the changeover speed and the maximum speed, and a servo valve operable by the governor to bleed fuel from the upstream side of the first of the metering orifices at a rate which decreases with increase in engine speed.

3. A fuel supply system as claimed in claim 2 in which the override valve has a movable seat and which includes means operable, upon movement of the throttle valve to an emergency position, to move the seat away from the override valve to increase the flow of fuel to the engine.

4. A fuel supply system as claimed in claim 2, which includes a pressure regulating valve controlling a restriction to the fuel flow as a function of altitude, the pressure regulating valve being arranged to provide a restriction to fuel flow which increases with increase in altitude.

5. A fuel supply system as claimed in claim 4, in which the override valve has a movable seat and which includes means operable, upon movement of the throttle valve to an emergency position, to move the seat away from the override valve to increase the flow of fuel to the engine.

6. A fuel supply system as claimed in claim 4, in which the pressure regulating valve is controlled by a diaphragm subject at one side to the pressure of a spring and at the other to fuel at a pressure which is a fraction of the pressure drop across the metering orifices.

7. A fuel supply system as claimed in claim 6, in which the override valve has a movable seat and which includes means operable, upon movement of the throttle valve to an emergency position, to move the seat away from the override valve to increase the flow of fuel to the engine.

8. A fuel supply system as claimed in claim 6, in which the side of the diaphragm remote from the spring is subject to the pressure of fuel in a line by-passing the metering orifices and including a valve, controlled by an altitude-responsive device and arranged to increase, as altitude increases, the fuel pressure applied to said remote side of the diaphragm.

9. A fuel supply system as claimed in claim 8, in which the override valve has a movable seat and which includes means operable, upon movement of the throttle valve to an emergency position, to move the seat away from the override valve to increase the flow of fuel to the engine.

10. A fuel supply system as claimed in claim 8, which includes means effective only while the acceleration control valve is controlling the flow of fuel to the burner for increasing the loading of the spring and thereby moving the pressure-regulating valve to a more open position as the engine speed increases.

11. A fuel supply system as claimed in claim 10, in which the override valve has a movable seat and which includes means operable, upon movement of the throttle valve to an emergency position, to move the seat away from the override valve to increase the flow of fuel to the engine.

12. A fuel supply system as claimed in claim 11, in which the governor is operative to position both the acceleration control valve and the override valve and in which the mechanism for varying the pressure drop across the metering orifices is a servo valve operable by the governor to bleed fuel from the upstream side of the first of the metering orifices at a rate which decreases with increase in engine speed.

13. A fuel supply system, for an aircraft jet engine having a main burner, comprising a pump arranged to supply fuel to the main burner through three independently controlled metering orifices in series, one of the orifices being controlled below a predetermined changeover speed by an acceleration control valve subject to the action of an acceleration control unit, another of the orifices being controlled by an override valve actuated by a governor to prevent the engine speed exceeding a predetermined maximum, and the third orifice being controlled by a throttle valve during the range of speeds between the changeover speed and the maximum speed, and mechanism for varying the pressure drop across the orifices as a function of engine speed, the acceleration control valve and the throttle valve each having cylindrical and coned portions which coact selectively with their respective metering orifices, the cylindrical portion of each valve being operative when the coned portion of the other valve is controlling the fuel flow through its respective metering orifice.

14. A fuel supply system as claimed in claim 13, in which the override valve has a movable seat and which includes means operable, upon movement of the throttle valve to an emergency position, to move the seat away from the override valve to increase the flow of fuel to the engine.

15. A fuel supply system as claimed in claim 13, in which the governor is operative to position both the acceleration control valve and the override valve and in which the mechanism for varying the pressure drop across the metering orifices is a servo valve operable by the governor to bleed fuel from the upstream side of the first of the metering orifices at a rate which decreases with increase in engine speed.

16. A fuel supply system as claimed in claim 15, in which the override valve has a movable seat and which includes means operable, upon movement of the throttle valve to an emergency position, to move the seat away from the override valve to increase the flow of fuel to the engine.

References Cited
UNITED STATES PATENTS

| | | | |
|---|---|---|---|
| 2,644,513 | 7/1953 | Mock | 60—39.28 XR |
| 2,848,869 | 8/1958 | Russ | 60—39.28 |
| 3,195,308 | 7/1965 | McCombs | 60—39.28 |
| 3,230,709 | 1/1966 | Turner | 60—39.28 |

JULIUS E. WEST, *Primary Examiner.*